T. A. WILLARD.
SEPARATOR FOR STORAGE BATTERIES AND PROCESS OF MAKING THE SAME.
APPLICATION FILED JULY 24, 1914.
1,218,967.
Patented Mar. 13, 1917.
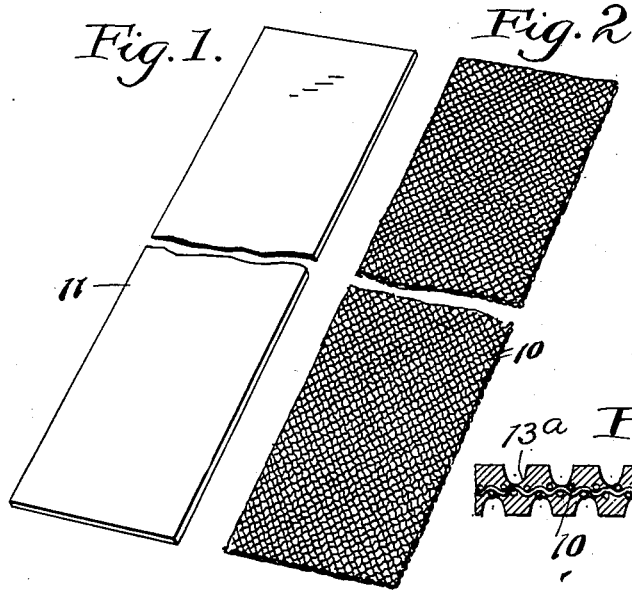
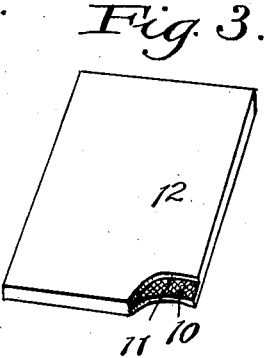
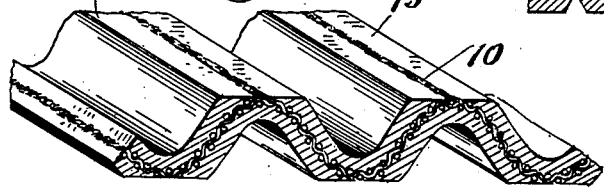
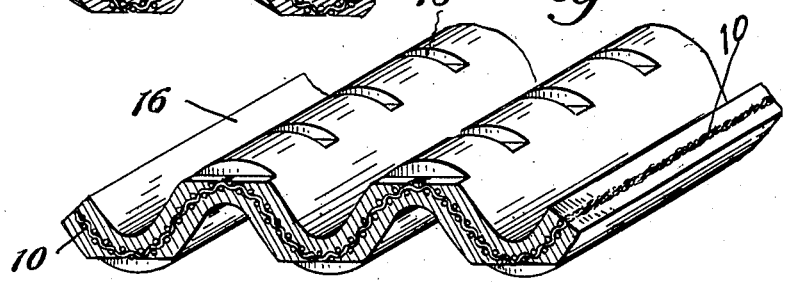
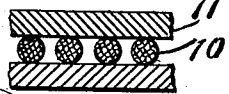
Witnesses
E. B. Gilchrist
L. I. Porter
Inventor
Theodore A. Willard
by Thurston & Kwis
Attorneys

UNITED STATES PATENT OFFICE.

THEODORE A. WILLARD, OF CLEVELAND, OHIO.

SEPARATOR FOR STORAGE BATTERIES AND PROCESS OF MAKING THE SAME.

1,218,967. Specification of Letters Patent. Patented Mar. 13, 1917.

Application filed July 24, 1914. Serial No. 852,943.

*To all whom it may concern:*

Be it known that I, THEODORE A. WILLARD, a citizen of the United States, residing at Cleveland, in the county of Cuyahoga and State of Ohio, have invented a certain new and useful Improvement in Separators for Storage Batteries and Processes of Making the Same, of which the following is a full, clear, and exact description.

This invention relates to storage battery separators and to the process of making the same.

A satisfactory separator should be formed of insulating material, and should be sufficiently porous that the battery as a whole will have a low internal resistance, but the pores in this separator should be sufficiently small and numerous that while they permit the battery solution and current to pass freely through the separator, they should prevent the passage therethrough of the oxids of lead. Additionally, the separator should be durable and have life co-extensive with the other parts of the battery.

The best separators used heretofore are made of wood or hard rubber, although some have been made also from other materials such as celluloid. The wood separator is perhaps the most efficient, but has a serious objection that it is not durable, its life being comparatively short. Rubber separators while more durable than the wood separators are expensive, due chiefly to the necessity of perforating them, and have the objection also that the perforations cannot be made sufficiently small or numerous to give the best results. Separators made of other materials, while perhaps satisfactory in some respects are objectionable in other respects. For example, a separator of celluloid is very inflammable, and for that reason its use is often prohibited.

The object of the invention is to provide a separator which is durable and inexpensive to manufacture and in which the pores are sufficiently small and numerous to produce the desired results.

In carrying out my invention, I provide a separator having contained or embedded in the body thereof a layer or sheet of material which produces the pores and which is exposed at intervals on opposite sides of the body.

This is preferably done by embedding in the separator body which may be of rubber a layer of the pore producing material such as woven cloth threads, hair, fiber or other suitable material, and thence cutting, slicing or grinding opposite sides of the separator body down to the separator material, thus forming minute pores or passageways through the separator.

My invention may be briefly summarized as consisting in a separator having certain features or characteristics of construction, and in certain novel steps of the herein described process of producing the same.

In the accompanying sheet of drawings wherein I have shown separators formed in accordance with my invention and have illustrated the preferred ways in which they are formed, Figures 1 and 2 are perspective views, respectively, of strips or sheets of separator material and porosity producing material which are used in the construction of the separator; Fig. 3 is a perspective view of the separator or separator plate before the same has been cut or treated on opposite sides to expose the porosity producing material; Fig. 4 is an enlarged sectional view of a portion of the composite strip formed from two strips or sheets of rubber of other separator material with an intermediate strip or sheet of porosity producing material, before the same has been compressed to cause the separator material to fill the interstices of the intermediate porosity producing material; Fig. 5 is a similar view showing the same after compression and other suitable treatment such as vulcanization; Figs. 6 and 7 are sectional views through portions of two finished separators constructed in slightly different forms; Figs. 8 and 9 are enlarged perspective views showing portions of separators finished in still further forms, or constructed in accordance with further modifications of my invention.

In carrying out my invention, I form what may be termed a composite plate or sheet composed of a suitable separator material in which is embedded at or about the center of the plate or sheet a layer of porosity producing material. This composite plate or sheet is preferably formed in the manner described below, but any other suitable way of embedding the intermediate porosity producing material in the insulating separator material which forms the body of the separator may be employed. I prefer, however, to place the porosity producing material which may be in sheet form, as illustrated at 10 in Fig. 2, between two sheets or layers of suitable insulating separator material, such as shown at 11 in Fig. 1, the said sheets or layers 11 being preferably in a plastic state and being previously rolled to the proper thickness. This can be done very effectively by first placing the sheet 11 on a suitable support or table, thence placing the sheet 10 on the lower sheet 11, and thence placing the second sheet 11 on top of the sheet 10. The sheets 10 and 11 may be previously cut to dimensions corresponding substantially to the dimensions of a single plate from which the finished separator is made, or these sheets may be of indeterminate length or length and width, and the composite sheet or plate may be subsequently cut into sections suitable for the separators.

For the separator material I prefer to use rubber or rubber compound, the materials or ingredients of which are mixed so that hard rubber may eventually be produced therefrom. I do not wish to confine my invention, however, to the use of rubber for other materials may be used, although I believe not so effectively as rubber. As examples of other material which might be used I will mention bakelite and celluloid.

For the porosity producing material I prefer to use coarse woven cloth, such as "scrim", which may be cut on the bias, as illustrated in Fig. 2. Instead of using woven cloth I may use to good advantage hair cloth or I may use unwoven hair or unwoven threads, strands or fibers, or the like. I may also use to advantage thin strands of wood, or other fibrous material not herein mentioned. The above mentioned materials are all more or less porous, but I do not wish to be confined to materials which in their natural state are porous, as I may employ non-porous material, such as fine wire or wire gauze, which by suitable acid treatment will render the separator porous, as will be explained.

When the layers 10 and 11 are superimposed in the manner above stated the body thus formed is subjected to pressure so as to cause the material of the upper and lower layers 11 to completely fill the interstices of the intermediate porosity producing layer 10, and so as to cause the two layers to thoroughly unite at or about the center plane of the body, thus making the layers as of one body or forming the same into what may be termed a homogeneous body. In Fig. 4 there is shown on an enlarged scale the three layers before the pressure is applied, and in Fig. 5 is shown the homogeneous body or sheet produced after the interstices of the middle layer are filled by subjecting the sheet to pressure. Thence the composite sheet is cut into suitable sections such as shown at 12 in Fig. 3. In this figure a corner of the plate or section is broken away so as to show the porosity producing material 10 and the non-porous separator material 11 on the opposite sides thereof.

The separator plates may then be molded into any desired form, such as the corrugated form illustrated in Figs. 8 and 9, or they may be left flat, if desired. In any event, assuming that rubber is used the plates will also be thoroughly vulcanized, so as to produce hard rubber and so as to thoroughly vulcanize together the two layers 11 between or in the interstices of the middle layer 10. If other material than rubber is used the plates will be suitably treated or will otherwise be permitted to reach their permanent hard state.

The next step in the process consists in cutting, sawing, grinding or otherwise treating the plate on opposite sides thereof, so as to expose the porosity producing material and to thus form the finished separator.

In Fig. 6 I have shown at 13 a finished separator which is provided on opposite sides with U-shaped slots 13$^a$, each of which extends to the porosity producing material 11, and the slots on one side of the separator being staggered with respect to those on the opposite side of the separator. This produces on opposite sides of the separator ribs 13$^b$ which are very desirable, and by exposing the porosity producing material renders the separator porous on direct lines extending from the base of each slot to the base of the adjacent slot or slots on the opposite side of the separator, so that the separator has in effect minute and numerous pores extending from one side thereof to the other.

In Fig. 7 there is shown a separator 14, which is very similar to the one shown in Fig. 6, the difference residing in the shape of the slots, the said slots 14$^a$ in Fig. 7 being V-shaped with the bases of the slots extending to the porosity producing material 11.

In Fig. 8, wherein is shown a separator 15 molded into corrugated form, the separator is made porous by grinding or cutting off the top portions of the corrugations, as shown at 15$^a$, each corrugation being cut down to the porosity producing material.

In Fig. 9 a corrugated separator 16 is made porous in a somewhat different manner. In this case the top portions of the corrugations are notched or cut transversely of the corrugations, as shown at 16$^a$, the notches extending down to the porosity producing material.

The above described figures illustrate the fact that the composite plates may be treated in numerous ways to cause the previously non-porous plates to have numerous and minute pores in effect extending direct from one side of the separator to the other so that the latter will be pervious to battery solution and electricity, but will be too small to carry through the separator oxids of lead. I do not desire, however, to be confined to any of the ways of cutting or treating the plates herein illustrated and described, nor to the precise method described, by which the layer of porosity producing material may be embedded in the body of the separator and is caused to be exposed on opposite sides thereof, for the plates may be otherwise made or treated without departing from my invention in its broad aspects.

It may be stated also that while the above described figures illustrate some of the forms that the finished separator may assume, I have by no means illustrated all of them. By way of example it may be stated that the separator may be in the form of a receptacle to hold a plate or a portion of a plate or an electrode, or it may be formed and used as a porous diaphragm in any part of the battery requiring such materials, and hence may assume any shape required by the exigencies of the case.

As before stated, I may use for the porosity producing material, material which in its original or natural state is not porous, such as fine steel wire or fine metal gauze. When porosity producing material of this character is used, it will be embedded in the separator in the same way that the porous material above described is embedded, and to then render the separator porous, it will be treated with a suitable acid, such as sulfuric acid, which will dissolve out the fine strands of metal, leaving minute pores extending in effect from one side of the separator to the other. However, I do not regard the use of the soluble non-porous porosity producing material as effective or as desirable as the non-soluble porous material previously described.

Having thus described my invention, what I claim is:—

1. A separator, comprising a body of separator material having embedded therein a sheet or layer of porosity producing material which is exposed at intervals at the surface on opposite sides of the body.

2. A separator, composed of a body of separator material having porosity producing material embedded therein, and having portions removed from opposite sides thereof down to said porosity producing material.

3. The method of producing a porous separator which comprises embedding in the body of the separator porosity producing material and removing portions of the body on opposite sides thereof down to the porosity producing material on the opposite surfaces of the separator.

4. The method of producing a porous separator, which comprises forming the separator body of non-porous material and embedding therein a sheet or layer of porosity producing material, and thence exposing said sheet or layer on opposite sides of the body by removing portions of the body down to the said sheet or layer.

5. The method of producing a porous separator, which comprises forming the separator body of non-porous material and embedding therein a sheet or layer of porosity producing material, and thence cutting the body on opposite sides down to the porosity producing material.

6. A separator, comprising a body of separator material having embedded therein a sheet or a layer of porous woven fabric which is exposed at the surface on opposite sides of the separator.

7. A separator, comprising a body of rubber having embedded therein a sheet or a layer of porous woven fabric, having a general direction parallel with the planes of the surface of said body and exposed at the surface on opposite sides of the separator.

8. A diaphragm composed of a body of rubber having a sheet or a layer of porous material extending substantially centrally through the same and exposed on opposite sides of the separator.

In testimony whereof, I hereunto affix my signature in the presence of two witnesses.

THEODORE A. WILLARD.

Witnesses:
L. I. PORTER,
A. F. KWIS.